(12) United States Patent
Heym et al.

(10) Patent No.: US 12,508,069 B2
(45) Date of Patent: Dec. 30, 2025

(54) MULTI-LUMEN PROBE

(71) Applicant: Erbe Elektromedizin GmbH, Tuebingen (DE)

(72) Inventors: Johannes Heym, Tuebingen (DE); Martin Walz, Tuebingen (DE)

(73) Assignee: ERBE ELEKTROMEDIZIN GMBH, Tuebingen (DE)

( * ) Notice: Subject to any disclaimer, the term of this patent is extended or adjusted under 35 U.S.C. 154(b) by 533 days.

(21) Appl. No.: 17/498,976

(22) Filed: Oct. 12, 2021

(65) Prior Publication Data
US 2022/0117657 A1 Apr. 21, 2022

(30) Foreign Application Priority Data
Oct. 16, 2020 (EP) .................................. 20202362

(51) Int. Cl.
*A61B 18/14* (2006.01)
*A61B 18/00* (2006.01)
*A61B 18/04* (2006.01)

(52) U.S. Cl.
CPC ........ *A61B 18/1492* (2013.01); *A61B 18/042* (2013.01); *A61B 2018/00589* (2013.01); *A61B 2018/1435* (2013.01)

(58) Field of Classification Search
CPC .............. A61B 18/1492; A61B 18/042; A61B 2018/00589; A61B 2018/1435; A61B 2018/00077; A61B 2018/00107; A61B 2018/00982; A61B 2018/1253; A61B 2018/00083; A61B 18/12; A61B 18/1206; A61B 18/14; A61B 18/1477; A61B 2018/00148; A61B 2018/048;
(Continued)

(56) References Cited

U.S. PATENT DOCUMENTS

| 4,901,719 A | 2/1990 | Trenconsky et al. |
| 6,958,063 B1 | 10/2005 | Soll et al. |
| 2006/0036239 A1 | 2/2006 | Canady |

(Continued)

FOREIGN PATENT DOCUMENTS

| CN | 1463186 A | 12/2003 |
| CN | 1870945 A | 11/2006 |

(Continued)

OTHER PUBLICATIONS

Extended European Search Report dated Mar. 31, 2021, in corresponding European Application No. 20202362.8, with machine English translation (20 pages).

(Continued)

*Primary Examiner* — Adam Z Minchella
*Assistant Examiner* — Ashleigh Lauren Kern
(74) *Attorney, Agent, or Firm* — Fitch, Even, Tabin & Flannery LLP

(57) ABSTRACT

An instrument includes a probe hose in the center of which a conductor is provided for electrical supply of an electrode. Concentrically around the conductor multiple gas-guiding lumens are arranged that are isolated from one another by separation walls. The separation walls support a center section that is centrally arranged and accommodates the conductor. With this probe design particularly flexible and particularly slim probes can be created that have a particularly high dielectric strength.

20 Claims, 4 Drawing Sheets

(58) Field of Classification Search
CPC .. A61B 2018/1246; A61B 2018/00166; A61B 2018/00583; A61B 2018/00964
See application file for complete search history.

(56) References Cited

U.S. PATENT DOCUMENTS

| | | | |
|---|---|---|---|
| 2008/0147056 A1* | 6/2008 | van der Weide | A61B 90/37 606/33 |
| 2009/0024122 A1* | 1/2009 | Fischer | A61B 18/042 600/104 |
| 2009/0043368 A1 | 2/2009 | Jung et al. | |
| 2009/0270849 A1* | 10/2009 | Truckai | A61B 18/042 606/49 |
| 2010/0114092 A1 | 5/2010 | Eisele et al. | |
| 2015/0216582 A1 | 8/2015 | Nagtegaal et al. | |
| 2017/0224404 A1* | 8/2017 | Sartor | A61B 18/042 |
| 2017/0238993 A1* | 8/2017 | Curley | A61B 18/16 |
| 2017/0303989 A1 | 10/2017 | Kirwan, Jr. | |
| 2018/0353233 A1 | 12/2018 | Brodbeck et al. | |

FOREIGN PATENT DOCUMENTS

| | | | | |
|---|---|---|---|---|
| CN | 203564325 U | 4/2014 | | |
| CN | 203988343 U | 12/2014 | | |
| CN | 109310462 A | 2/2019 | | |
| CN | 208447766 U | 2/2019 | | |
| CN | 110478035 A | 11/2019 | | |
| DE | 10 2015 212 706 A1 | 1/2017 | | |
| EP | 0353177 A1 * | 1/1990 | | A61B 18/14 |
| EP | 0738519 A1 | 3/2004 | | |
| EP | 3205301 B1 | 10/2018 | | |
| EP | 3412234 A1 | 12/2018 | | |
| JP | H 3-93523 A | 4/1991 | | |
| JP | 2002-301088 A | 10/2002 | | |
| JP | 2014-519875 A | 8/2014 | | |
| RU | 2508067 C2 | 2/2014 | | |
| RU | 2532364 C2 | 11/2014 | | |
| WO | 2006/081191 A1 | 8/2006 | | |
| WO | 2006/119892 A1 | 11/2006 | | |
| WO | 2008/090004 A1 | 7/2008 | | |
| WO | 2018041483 A1 | 3/2018 | | |

OTHER PUBLICATIONS

Chinese Patent Office; Chinese Office Action and Search Report in corresponding Chinese Patent Application No. 202111205237.X, dated Jun. 17, 2024; 20 pages.
Federal Service for Intellectual Property of the Russian Federation; Office Action in corresponding Russian Patent Application No. 2021129427/28 (062462) dated Oct. 30, 2024; 8 pages.
Federal Service for Intellectual Property of the Russian Federation; Search Report in corresponding Russian Patent Application No. 2021129427/28 (062462), 4 pages.
Japan Patent Office; Notice of Reasons for Refusal in corresponding Japanese Patent Application No. 2021-167012, dated Dec. 2, 2024; 14 pages.
Japan Patent Office; Japanese Decision of Refusal in corresponding Japanese Patent Application No. 2021-167012, dated Jun. 23, 2025; 10 pages.
National Intellectual Property Administration, P. R. China; Notification to Grant Patent Right for Invention in corresponding Chinese Patent Application No. 202111205237.X, dated Nov. 11, 2025; 6 pages.

* cited by examiner

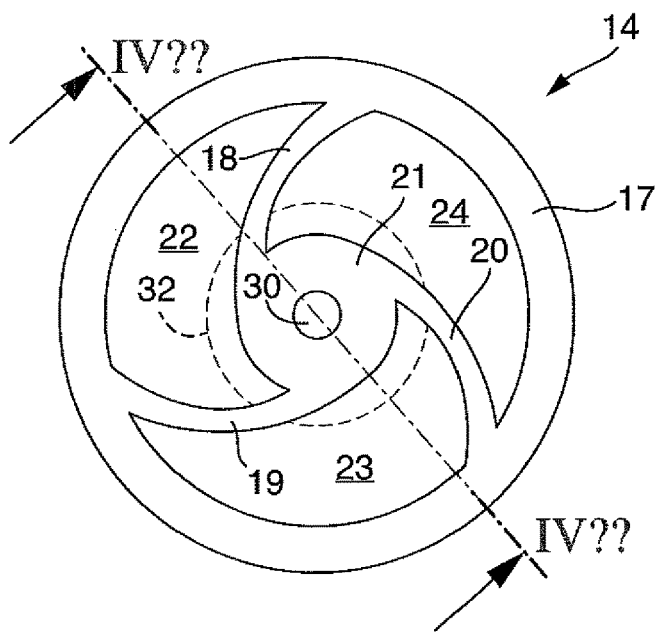
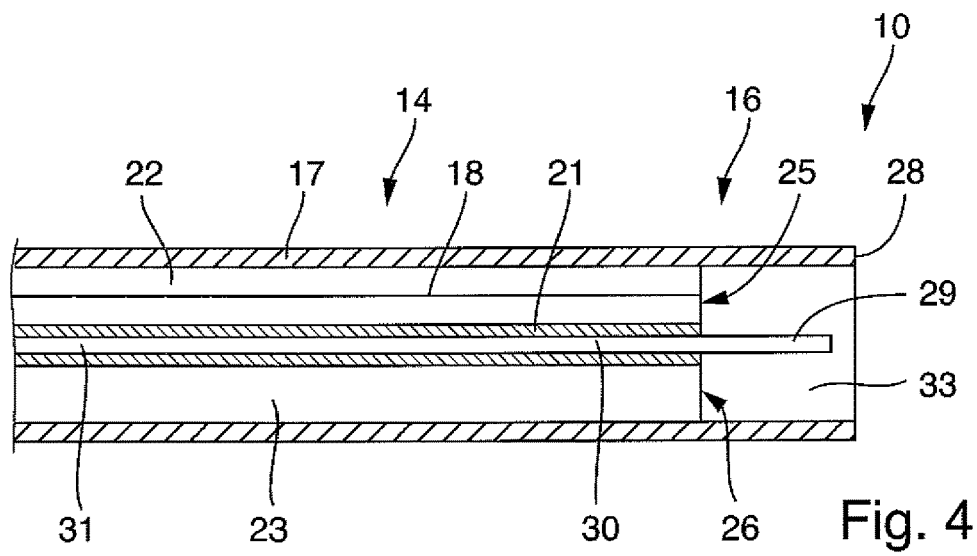
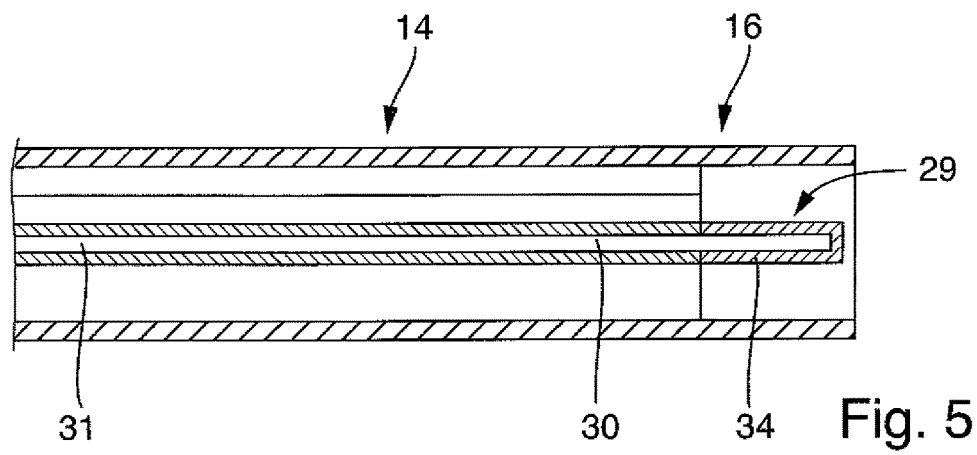

MULTI-LUMEN PROBE

RELATED APPLICATION(S)

This application claims the benefit of European Patent Application No. 20202362.8, filed Oct. 16, 2020, the contents of which are incorporated herein by reference as if fully rewritten herein.

TECHNICAL FIELD

The invention refers to an instrument for treatment of biological tissue, particularly for argon plasma coagulation thereof in endoscopic use.

BACKGROUND

Endoscopic usable instruments for argon plasma coagulation are basically known. WO 2008/090004 A1 discloses such an instrument having a flexible hose and two electrodes provided therein between which a light arc can be ignited. The hose-like instrument comprises one or two lumens, wherein in the variant having two lumens an outer probe hose and two inner hoses are provided in which the two lumens are formed. Each lumen is assigned to one of the two electrodes. The respective electrode is connected with a conductor that extends without own insulation over the total length of the instrument through the lumen that is assigned to it. The electrode is centrally held in a gas outlet opening of the respective lumen. Thereby the outer probe hose comprises an oval cross-section.

A multiple lumen instrument is known from WO 2006/119892 A1 in which in a probe hose another hose is arranged concentrically in which an electrode is held. For support thereof in the inner hose, it comprises a helical-wound section with which it is supported at the inner wall of the inner hose. For fastening the inner hose in the center of the outer hose, radially orientated spacers are provided.

Also, a bipolar instrument is known from EP 3 205 301 B1. This instrument comprises a probe hose having a lumen and two electrodes embedded in the probe hose. While one of the electrodes is provided with a metal ring seated on a ceramic sleeve, the other electrode is located centrally in the central passage of the ceramic sleeve. The ceramic sleeve forms an electrical insulator, such that an electrical barrier discharge and thus a non-thermal plasma forms in the interior thereof.

A manual instrument provided for the open surgical use is known from EP 0 353 177 A1 that comprises at its distal end an outlet channel and an electrode arranged therein. The line provided for the supply of gas to this manual instrument comprises multiple lumens.

Additional prior art is formed by EP 0 738 519 A1, JP 2002-301088 A and EP 3 412 234 A1.

Probes for creation of thermal plasma are subject to a remarkable thermal stress that poses limits to the design of such probes. In addition, high electrical voltages are necessary for plasma creation that require a large wall thickness of the probe hose in order to achieve the necessary dielectric strength. This has to be considered for the geometrical design of the probes and results typically to disturbing stiffness of the probe, due to the common design.

It is therefore an object of the invention to provide a basic concept for an instrument that achieves extended design possibilities.

SUMMARY

This object is solved with an instrument as described herein.

The instrument according to the invention can be particularly configured as monopolar instrument that is suitable for plasma coagulation, particularly argon plasma coagulation of biological tissue. The instrument is particularly a flexible probe. A current flows between the (preferably single) electrode of the instrument and the biological tissue in the plasma forming at or flowing out of the distal end of the probe.

The instrument (the probe) comprises a probe hose that comprises at least two, preferably three or more lumens that can be connected to a gas supply device. These lumens extend preferably through the whole probe hose from the proximal end to gas outlet openings located at the distal end. Preferably no current-conducting element or an electrical conductor or an electrode is arranged in any of the lumens.

At the distal end of the probe hose an electrode is arranged preferably centrally, the active end thereof is exposed without electrical insulation in this area. The active end of the electrode is the section thereof that is in contact with the gas stream exiting the gas outlet openings and is ionizing this gas stream. Thereby the active end of the electrode can reach remarkable temperatures of up to several 100° C. The gas outlet openings are grouped around the electrode.

The probe hose typically comprises, due to its multiple lumen configuration, an outer hollow cylindrical section, a preferably approximately cylindrical hub or center section concentrically arranged therein and preferably flat separation walls arranged in between in the manner of spokes. Preferably each separation wall comprises a substantially constant thickness from the center section to an outer section. Preferably the thickness varies about less than 20%. The center section, the separation walls and the outer hollow cylindrical section are preferably parts of one and the same plastic hose that consists of the same material and transition seamlessly into one another. A high electrical insulation ability and a high flexibility are obtained. Such hoses allow extension with small radii.

The electrical insulation is originating from the conductor in radial direction outwardly provided first and mainly by the center section. The radius of the center section is preferably equal to or larger than the outer wall section of the hose.

Maximizing the diameter of the center section hardly influences the flexibility of the probe hose, because the center section contributes little to the bending stiffness of the probe. On the contrary, the outer hollow cylindrical jacket can be configured in a relatively thin-walled manner. In doing so, fluid channels can be created in spite of the high insulation ability provided by the center section that comprise a large free-flowing cross-section.

The probe hose can be made of plastic that has less dielectric strength and/or comprises a higher modulus of elasticity than material used otherwise for argon plasma probes, such as e.g. fluoroplastics, particularly PTFE and FEP.

It is possible to provide the center section at its outer side and/or the jacket section at its inner side with a metallization or metal inlays in order to create equipotential surfaces. Also thereby the dielectric strength of the probe hose can be further increased.

However, it is preferred to dimension the radial thickness of the center section larger than the radial thickness of the jacket section, such that the electrical insulation is predominantly provided by the center section.

The gas outlet openings are preferably concentrically arranged around the electrode. The separation walls provided between the lumens of the probe hose can be inclined relative to the radial direction. Thereby, preferably, not all of the separation walls are inclined in the same direction. The lumens can have a cross-section substantially of a triangle with arc-shaped edges (two convex and one concave). Instead of sharp edges, also curves can be provided. Each of the above-mentioned measures individually contributes that the hose has equal flexibility and is equally insensitive against closing of a gas-guiding lumen in all radial directions due to bending the probe hose. Also the separation walls inclined relative to the radial direction contribute to the flexibility of the probe hose and also result in that the gas uniformly flows around the electrode.

Due to a curvature of the separation walls that is apparent in the cross-section as curvature around an axis orthogonal to the cross-sectional plane, the flexibility of the probe hose is supported and the electrical insulation strength is particularly guaranteed also at bending locations of the probe hose. The separation walls are placed during bending of the probe hose between the center section and the jacket section and increase the breakthrough field intensity. This is for the benefit of the electrical dielectric strength.

A conductor that is, apart therefrom, not additionally insulated can be embedded in the center section of the probe hose, which is thereby electrically insulated. Instead of a non-insulated conductor, however, also an insulated conductor can be embedded in the center section such that this electrical conductor is surrounded by a multi-layer insulation consisting of different materials. Also this can be used for the improvement of the electrical insulation or vice versa for miniaturization of the probe design. The conductor can be a wire or a braid of metal or an electrically conductive plastic. The multi-layer configuration of the insulation is a concept thanks to which the variety of the usable materials for the probe hose can be increased. For example, the center section can consist of a material that is optimized with regard to its electrical insulation abilities, whereas the jacket section (and/or also the separation walls) consist of a material optimized with regard to its flexibility.

The probe hose preferably comprises a constant cross-section originating from the proximal end up to the gas outlet openings. The gas-guiding lumen can be arranged straight, parallel to the center axis or can also have a helical extension.

The jacket section may extend beyond the gas outlet openings in distal direction such that at the distal end of the instrument a plasma chamber is formed, inside of which the distal end of the electrode is positioned. The jacket section can consist of the material of the probe hose. It is, however, also possible to make the end section surrounding the plasma chamber of a different material, e.g. ceramic.

It is in addition possible that the electrode projects out of the probe hose and is provided with a protective body at its free distal end. The protective body is preferably an electrically insulating body, e.g. a ceramic body, e.g. a ceramic ball or any other body. Preferably this protective body comprises a diameter that is remarkably larger than the electrode diameter and, for example, approximately coincides with the outer diameter of the probe hose. The protective body is preferably rounded at its distal end surface and free of tips or sharp edges. This concept is particularly suitable for radial probes that can output a plasma stream in an arbitrary radial direction. In case of an asymmetric configuration of the protective body, e.g. in form of an inclined orientated ceramic disc or the like, also radial directions can be defined for the preferred plasma output.

The electrode can be configured at its end section as bare wire end. For example, the wire can consist from a chromium nickel steel that has poor thermal conductivity and thus introduces low heat in the center section of the probe hose, where it is in direct contact with the plastic of the probe hose. It is also possible to provide the electrode configured as wire extending through the probe hose along the total length or at least in the section of its distal end, e.g. in the active end section, with a coating. The coating is preferably of an electrically conductive material. Preferably the material is a metal, the melting temperature of which is less than the melting temperature of the electrode. For example, the coating can be made of silver or a silver alloy. Yet preferably a further layer can be provided between the base material of the electrode (e.g. chromium nickel steel) and the low-melting coating, e.g. an adhesive layer, e.g. in the form of a gold layer. Such electrodes are steady and transfer less heat in the probe hose. Due to the coating and the thereby achieved lower thermal stress, it is now possible to attach an electrode directly in the probe hose. Plate electrodes or needle electrodes with helical base used so far, for example, have effected an increased cooling by convection as well as a certain distancing of the discharge zone from the hose. Both can be forgone in the present invention, whereby the configuration of a flexible and miniaturized probe becomes possible.

It is in addition possible to provide an electrode extension on the distal end of the wire extending through the probe hose. It can be, e.g. provided with a coating mentioned above.

BRIEF DESCRIPTION OF THE DRAWINGS

Further details of advantageous embodiments of the invention are derived from the dependent claims, the figures of the drawings as well as the associated description. The drawings show:

DETAILED DESCRIPTION

Figure 1:
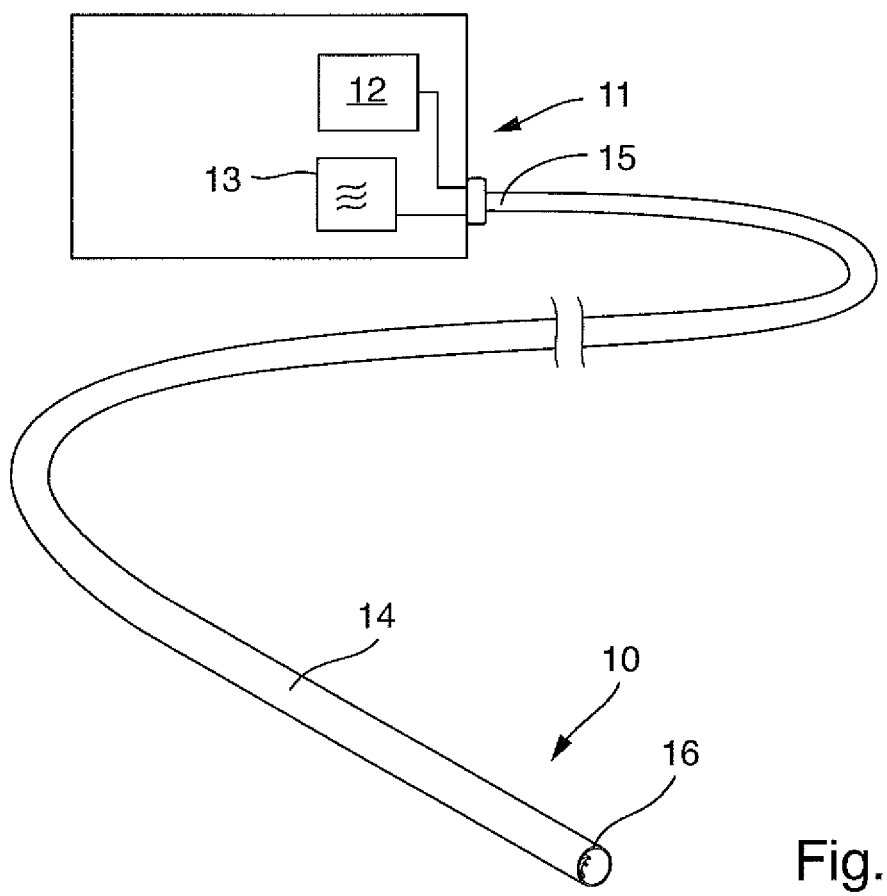
FIG. 1 an inventive instrument connected to a supplying apparatus in a schematic perspective illustration, FIG. 2 the distal end of the instrument in perspective illustration, FIG. 3 the instrument of FIGS. 1 and 2 in a front view, FIG. 4 the instrument according to FIG. 3 illustrating a detail in a longitudinal section, FIG. 5 a modified embodiment of the instrument according to FIG. 4 illustrating a detail in a longitudinal section, FIG. 6 another modified embodiment of the instrument according to FIG. 4 in an illustration of the distal end thereof in a longitudinal section, FIG. 7 the distal end of another embodiment of the inventive instrument in a partly sectional side view, FIGS. 8 and 9 an instrument with modified probe hose in front view respectively.
Figure 2:
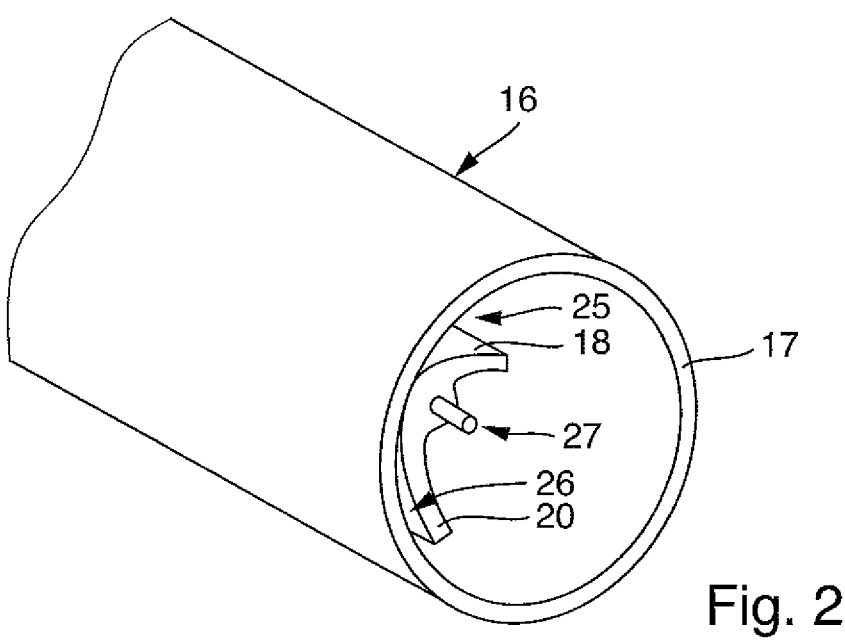

FIG. 1 shows a surgical instrument 10 in the form of a multi-lumen probe that is connected to a supplying apparatus 11. The multi-lumen probe can serve for surgical treatment of a patient and can therefore be introduced in the patient through the working channel of an endoscope. The apparatus 11 serves to supply the instrument 10 with the medium and the electrical current necessary for operation. For example, the apparatus 11 can therefore comprise a gas source 12 and an electrical generator 13. The gas source 12 can be, e.g. an argon source that is formed by a gas stock provided in a pressure container, e.g. argon stock, and respective control elements, such as valves, pressure regulators and the like. The electrical generator 13 is preferably a radio frequency generator for the output of a radio frequency alternating voltage with desired peak voltage, preferably adjustable modulation and/or adjustable power.

The instrument 10 comprises a probe hose 14 that extends from a proximal end 15 up to a distal end 16. The probe hose 14 is a flexible hose, preferably consisting of plastic, e.g. PTFE, FEP or also PA, TPE, HDPE or PP. The probe hose 14 comprises a preferably circular-shaped cross-section on the outside, as apparent from FIG. 3. Alternatively, the cross-section on the outside can also be polygonal, e.g. hexagonal or octagonal. The cross-section on the outside is defined by a circular-shaped jacket 17 from the inside of which multiple separation walls 18, 19, 20 extend to a hub-like center section 21 that is arranged in the center of the probe hose, having preferably a cylindrically shaped outer surface. Preferably an uneven number of separation walls is present from which a homogeneous stiffness results, i.e. a stiffness equal in all radial directions. By means of the separation walls 18, 19, 20 at least two, preferably three or more lumens 22-24 are separated from one another in the probe hose 14 that respectively extend from the proximal end 15 up to the distal end 16 or up to gas outlet openings 25, 26, 27 provided there and are grouped around the center section. Depending on the material and the accuracy of the extrusion, the cross-section of the outer surface and/or the cross-section of the center section can also be defined polygonally.

As apparent from FIG. 4, the gas outlet openings 25, 26 (and 27) are displaced backwardly relative to the end face of the probe hose 14 in proximal direction, such that a chamber-like depression is formed on the distal end 16 of the probe hose 14. The active end 29 of an electrode 30 extends into it, wherein the electrode 30 is held centrally in the center section 21. The chamber-like depression is a plasma chamber in which the current flow from the electrode 30 transitions on the plasma to be formed.

In the instrument 10 illustrated in FIG. 4 for emitting an axial plasma stream the active end 29 of the electrode 30 is completely arranged inside the instrument 10 and thus in the plasma chamber. The tip of the active end 29 of the electrode 30 is thus proximally displaced backward relative to the end face 28 of the probe hose 14. The electrode can also be located in one plane with the end face of the probe hose 14.

Originating from the electrode 30 an electrical conductor extends preferably centrically through the center section 21 up to the proximal end 15 in order to be connected with a pole of the generator 13 there. The other pole of the generator 30 is connectible or connected with a not illustrated neutral electrode that is attachable on a patient for conducting the current back. Thus, the instrument 10 is a monopolar instrument in which the patient is part of the treatment current circuit.

The electrode 30 can be configured in one single piece with the electrical supply line 31 extending away in proximal direction and can thus be part thereof. The electrode 30 can, however, also be formed by a separate metal element that is connected with the supply line 31. Preferably the electrode 30 consists of a material with low thermal conductivity, as e.g. stainless steel, particularly chromium nickel steel, e.g. with the following composition:

|  | Fe | C | Cr | Mn | P | S | Si | Ni | N | Mo |
|---|---|---|---|---|---|---|---|---|---|---|
| min |  | 0.05 | 16.0 |  |  |  |  | 6.0 |  |  |
| max | 47.605 | 0.15 | 19.0 | 2.0 | 0.045 | 0.15 | 2.0 | 9.5 | 0.11 | 0.8 |

At least the active end 29 or also the whole electrode 30 can be provided with a coating. The coating can extend also over the total length of the conductor 31. The coating is preferably a metal coating, the melting temperature thereof being less than the melting temperature of the electrode 30 or the active end 29 respectively. Particularly, the coating can be formed by a silver layer. Between the silver layer and the material of the electrode or the active end 29 of the electrode 30 an adhesive layer can be provided. The adhesive layer consists preferably of a material, the melting temperature of which is less than the melting temperature of the electrode 30 or the active end 29 thereof. Preferably the melting temperature of the adhesive layer is, however, at least as high as the melting temperature of the coating. The adhesive layer can be, for example, a gold layer.

In operation the electrode 30 and the conductor 31 are subject to a high voltage that can have an amount of multiple 100 V up to multiple 1000 V. For electrical insulation of the conductor 31, the center section 21 comprises a thickness in radial direction that is preferably larger than the thickness of the jacket 17 to be measured in radial direction. The center section 21 as well as the jacket 17 contribute to the electrical insulation of the conductor 31 relative to the surrounding endoscope and/or the surrounding biological tissue. Due to the indicated distribution of the material strength in favor of the center section 21, a high flexibility of the probe hose 14 is obtained. In addition, the flow cross-section of the lumens 22, 23, 24 is as large as possible. If required, the radial thickness of the center section 21 can be increased remarkably, for example, as illustrated by a dashed circle 32 in FIG. 3. This improves the electrical insulation of the conductor 31 remarkably without substantially affecting the flow cross-section of the lumens 22, 23, 24.

For further increase of the flexibility and/or for equalizing the bendability in all radial directions and for avoiding a lumen closure during bending of the probe hose 14, the separation walls 18, 19, 20 can be configured in an inclined and also curved manner, as apparent from FIG. 3. If such a probe hose 14 is bent with a small bending radius, the separation walls 18, 19, 20 can abut at one side of the bend against the center section 21, whereas the other separation walls 19, 20 can erect. Thereby always at least one, mostly two or three of the lumens are open such that the gas stream can flow freely in distal direction. A bending of the probe hose 14 with a blockage of the lumens does not occur.

The instrument 10 described so far is supplied with gas, e.g. argon, during operation that flows through the lumens 22, 23, 24 parallel with one another and exits out of the gas outlet openings 25-27. It flows around the electrode 30 or its active end 29 that ionizes the gas stream and thus creates a plasma stream exiting distally from the instrument 10 that impinges on surrounding tissue. This is connected with the counter pole of the generator 13 by means of the neutral electrode mentioned above, such that a current flow between the active end 29 of the electrode 30 and the tissue is established.

Due to the combination of several measures, namely
uniform gas flow from the outlet openings 25, 26, 27,
coating of the electrode 30, e.g. with silver, at least at the distal end,
concentration of the electrical insulation in the center of the probe cross-section, the instrument 10 can be miniaturized to great extent. It is possible to reduce the outer diameter of the probe hose 14 to less than 1 mm without the heat originating from the active end 29 of the electrode 30 resulting in a quick damaging of the probe hose 14. This applies even in the case, if the wire or rod-shaped electrode 30, i.e. preferably configured in a straight manner, is in two-dimensional contact at the periphery with the plastic of the probe. A quick thermal damaging of the probe hose is particularly avoided, if the active end 29 is provided with a suitable coating, such as for example, the named silver coating, that results in a concentration of the electrical discharge to the distal end of the active end 29 of the electrode 30. Finally a highly miniaturizable very flexible probe is obtained that offers fields of application for the argon plasma coagulation that have been unreachable so far.

The structure formed particularly on the distal end 16 of the instrument 10 can be produced in a manufacturing method in which a probe hose extruded on a conductor 31 is cut first, wherein subsequently a plasma chamber 33 provided there and apparent from FIG. 4 is introduced at the distal end 16. For this distal sections of the separation walls 18, 19, 20 and, if necessary, a part of the center section 21 are removed, for example mechanically. The electrode 30 can also be slightly shortened such that it does not project beyond the end face 28 of the probe hose 14. It is, however, also possible to create the plasma chamber 33, in that the cut probe hose 14 during the first use on the patient or also by the manufacturer under controlled conditions is briefly operated such that the active section 29 of the electrode 30 as a result of the heat development melts or burns away a part of the separation walls 18, 19, 20 as well as the center section 21. This process can be supported, in that instead of argon, another suitable gas, e.g. reactive gas, such as $CO_2$, air or the like is used.

Numerous modifications are possible at the probe described so far. For example, the walls 18, 19, 20 can adjoin the center section 21 tangentially as illustrated. They can adjoin there, however, also radially and can then transition into an inclined orientation. Also the walls 18, 19, 20 can adjoin the jacket 17 tangentially. They can adjoin there, however, also radially and apart therefrom be in an inclined orientation.

Figure 6:
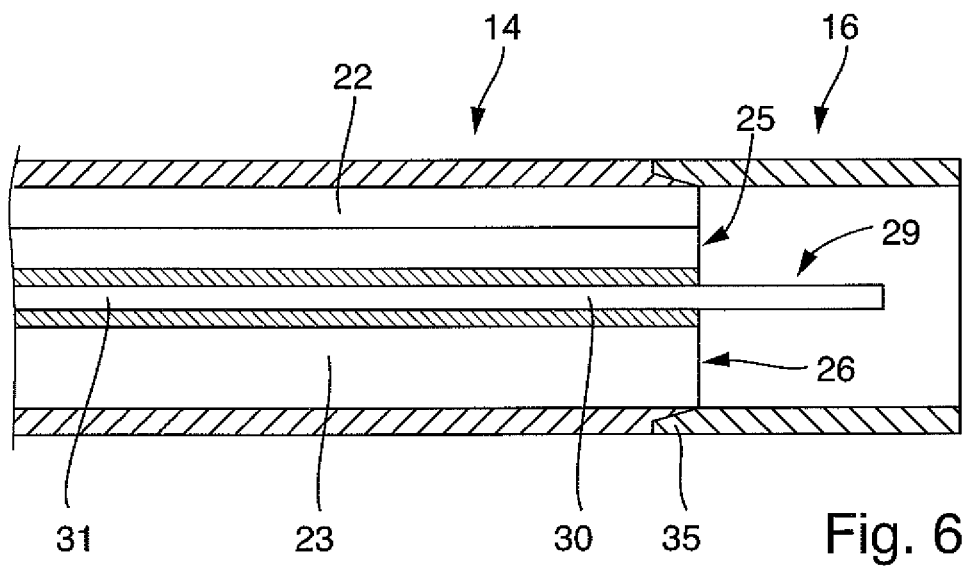

In all embodiments the distal end 16 of the probe hose 14 can be provided with a sleeve-shaped element 35 that is made of a material that is different from the material of the probe hose 14. For this FIG. 6 illustrates a probe hose 14 by way of example in which the element 35 is formed by a ceramic sleeve. It can be connected to the probe hose 14 by means of a dull joint in a stepped joint or also on conical interface. The connection can be carried out by gluing, welding, e.g. ultrasonic welding or by other form-fit and/or substance bond connection techniques. In relation to the configuration and the positioning of the electrode 30 and its active end 29, the explanations given above apply accordingly to the above-described embodiments.

Figure 7:
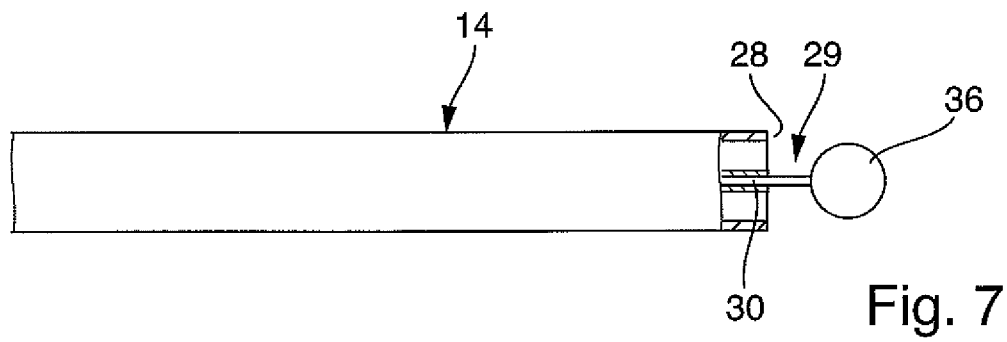
Figure 8:
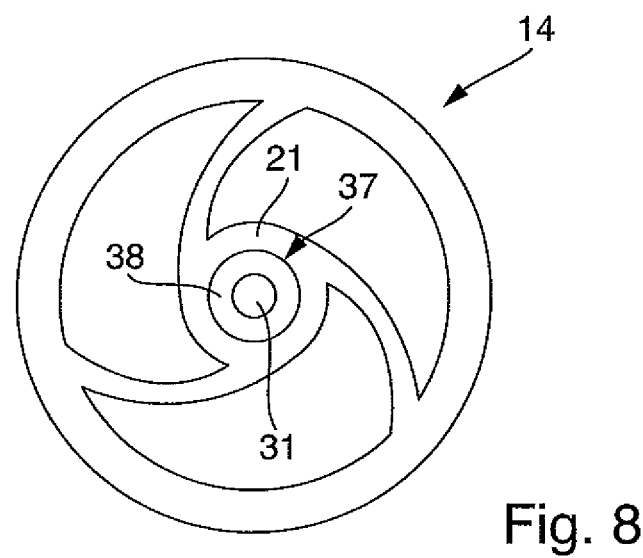

In all embodiment described above, however, the active end 29 of the electrode 30 can also project beyond the end face 28 of the probe hose 14, as apparent from FIG. 7. In this case, the end of the electrode 30 can be provided with a protective body 36, e.g. in the form of an insulator, e.g. in the form of a ceramic element. The protective body 36 is preferably rotationally symmetrically configured with regard to the active end 29 of the electrode 30. For example, it is plate-shaped, pyramid-shaped, ball-shaped, mushroom-shaped or the like. It is preferably configured such that with view from the electrode 30, all radial directions are free. Thus, the plasma stream can be directed in 360° in any arbitrary radial direction. However, it is also possible to configure the protective body 36 asymmetrically and to combine it or connect it with element 35. In this manner asymmetric operating probes can be designed.

The above description of the embodiments according to FIGS. 1-7 assume that the conductor 31 is in direct contact with the material of the probe hose 14. In all embodiments described above it is, however, also possible to provide a cable 37 instead of a bare conductor 31 that consists of the conductor 31 and a cable insulation 38 applied thereon. The cable insulation can be formed, for example, by an insulating varnish or by a plastic hose. The material of the probe hose 14 is applied on the cable insulation 38 such that the inside of center section 21 consists of the material of the cable insulation 38 and the material of the probe hose that is applied on the cable insulation 38. With this concept the safety against voltage breakthrough can be further increased. The material of the cable insulation 38 can be optimized in view of maximum dielectric strength. The stiffness of the material thereby plays a minor role. The material of the probe hose 14 can be optimized in this case on the other hand with regard to the desired flexibility.

For improvement of the dielectric strength at the boundary between the cable insulation 38 and the material of the probe hose 14 applied thereon, it is possible to provide a metallization that defines a cylindrically shaped equipotential surface. This can increase the dielectric strength.

Figure 9:
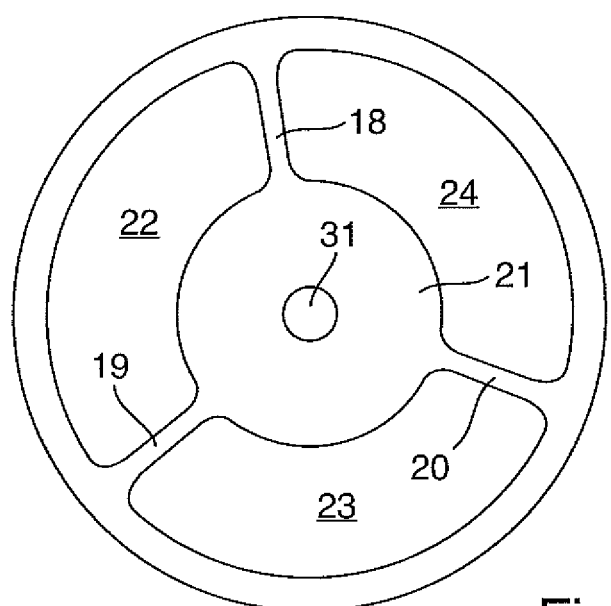

It is in addition possible to orientate the separation walls 18, 19, 20 radially, as illustrated in FIG. 9 and to thereby configure them straight or also curved.

An instrument 10 according to the invention comprises a probe hose 14 in the center of which a conductor 31 is provided for electrical supply of an electrode 30. Concentrically around the conductor 31 multiple gas-guiding lumens 22, 23, 24 are arranged that are isolated from one another by means of separation walls 18, 19, 20. The separation walls 18, 19, 20 support a center section 21 that is centrally arranged and accommodates the conductor 31, wherein the center section 21 decisively serves for electrical insulation of the conductor 31. With this probe design particularly flexible and particularly slim probes can be created that have a particularly high dielectric strength.

LIST OF REFERENCE SIGNS

10 instrument
11 apparatus
12 gas source
13 generator
14 probe hose
15 proximal end of probe hose 14
16 distal end of probe hose 14
17 jacket
18-20 separation walls
21 center section
22-24 lumen
25-27 gas outlet openings
28 end face of probe hose 14
29 active end of electrode 30
30 electrode
31 supply line
32 circle for illustration of an improved electrical insulation of line 31
33 plasma chamber
34 sleeve
35 element
36 insulation body
37 cable
38 cable insulation
39 radial inner beginning of face 28
40 transition between end face 28 and outer surface

The invention claimed is:

1. An instrument (10), comprising:
a probe hose (14) that comprises at least two lumens (22, 23) that are configured for being connected to a gas supply device (12);
an electrode (30) that is supported in the probe hose (14) and comprises an active end portion (29);
wherein each lumen (22, 23) comprises a gas outlet opening (25, 26) respectively, wherein the gas outlet openings (25, 26) are positioned adjacent the active end portion (29) of the electrode (30) so that a gas exiting the gas outlet openings (25, 26) is ionized by the active end portion (29) of the electrode (30);
a center section (21) of the probe hose (14) having an insulative body in which a portion of the electrode (30) proximal to the active end portion (29) is disposed and from which the active end portion (29) extends distally; and
separation walls (18, 19) that each extend between an outer surface portion of the insulative body of the center section (21) and a jacket (17) of the probe hose (14) that separate the at least two lumens (25, 26) from one another;
wherein each of the at least two lumens are defined by an outer surface portion of the insulative body of the center section, at least two of the separation walls, and an inner surface portion of the jacket of the probe hose;
wherein the portion of the electrode (30) proximal to the active end portion (29) is disposed in an insulated manner in the insulative body of the center section (21), wherein the insulative body of the center section (21) of the probe hose (14) comprises no lumen for flowing a gas supplied from the gas supply device (12) therethrough.

2. The instrument according to claim 1, wherein the gas outlet openings (25, 26) are concentrically arranged around the electrode (30).

3. The instrument according to claim 1, wherein the insulative body of the center section (21) has a radial thickness that is larger than a radial thickness of the jacket (17).

4. The instrument according to claim 1, wherein the separation walls (18, 19) are arranged in an inclined manner with regard to a radial direction of the probe hose (14).

5. The instrument according to claim 1, wherein the separation walls have a curved configuration.

6. The instrument according to claim 1, wherein the probe hose (14) has a circular cross-section on an outer side thereof.

7. The instrument according to claim 1, wherein the probe hose (14) is devoid of any additional electrodes and the electrode (30) is centrally arranged in the probe hose (14).

8. The instrument according to claim 1, wherein the electrode is embedded in an electrically insulated manner in the insulative body of the center section (21) of the probe hose (14).

9. The instrument according to claim 1, wherein the probe hose (14) comprises a jacket section (17, 35) extending beyond the gas outlet openings (25, 26) in a distal direction.

10. The instrument according to claim 9, wherein the jacket section (35) is of a different material than a material of the probe hose (14).

11. The instrument according to claim 1, wherein the electrode (30) comprises a distal end that is arranged inside the probe hose (14).

12. The instrument according to claim 1, wherein the electrode (30) comprises a distal end that is arranged outside of the probe hose (14), wherein an insulator (36) is disposed on the distal end of the electrode (30).

13. The instrument according to claim 1, wherein the electrode (30) is formed by a bare end section of a wire, wherein the wire is embedded in the insulative body of the center section of the probe hose (14) along an entire length thereof apart from the bare end section.

14. The instrument according to claim 13, wherein the bare end section supports an electrically conductive electrode extension (34).

15. The instrument according to claim 1, wherein the electrode (30) is at least in sections provided with an electrically conductive coating.

16. The instrument according to claim 1, wherein the separation walls (18, 19) of each of the at least two lumens (22, 23) extend along a length of the probe hose (14) from a proximal end of the probe hose to the gas outlet opening (25, 26) of each of the at least two lumens (22, 23).

17. The instrument according to claim 1, wherein the at least two lumens (22, 23) are arranged about the electrode (30) to allow for a uniform gas flow from the gas outlet openings (25, 26) thereof.

18. The instrument according to claim 1, wherein the separation walls (18, 19) are configured such that the probe hose (14) has a stiffness that is equal in all radial directions.

19. The instrument according to claim 1, wherein the separation walls (18, 19) consist of an uneven number of separation walls (18, 19, 20) such that the at least two lumens (22, 23) comprises at least three lumens (22, 23, 24) defined by an outer surface portion of the insulative body of the center section, at least two of the uneven number of separation walls, and an inner surface portion of the jacket of the probe hose.

20. The instrument according to claim 1, wherein no lumen for flowing a gas supplied from the gas supply device (12) is present between the electrode (30) and the insulative body of the center section (21).

* * * * *